United States Patent [19]

Goldberg et al.

[11] 4,371,191

[45] Feb. 1, 1983

[54] ADJUSTING AUTOMOBILE SUSPENSION SYSTEM

[75] Inventors: Jerome Goldberg, Cold Spring; Christopher D. Bloch, Hillsdale, both of N.Y.

[73] Assignee: Springhill Laboratories, Inc., Cold Spring, N.Y.

[21] Appl. No.: 123,024

[22] Filed: Feb. 20, 1980

Related U.S. Application Data

[63] Continuation-in-part of Ser. No. 826,709, Aug. 22, 1977, Pat. No. 4,191,274.

[51] Int. Cl.³ .............................................. B60G 17/00
[52] U.S. Cl. .................................... 280/707; 280/661
[58] Field of Search ...................... 280/707, 691, 661

[56] References Cited

U.S. PATENT DOCUMENTS

| | | | |
|---|---|---|---|
| 3,124,398 | 3/1964 | Corley et al. | 280/707 |
| 3,831,969 | 8/1974 | Lindblom | 280/707 |
| 4,067,154 | 12/1977 | Glaze | 280/707 |
| 4,164,664 | 8/1979 | Kasiewicz | 280/707 |
| 4,215,403 | 7/1980 | Pollard et al. | 280/707 |

*Primary Examiner*—Richard A. Bertsch
*Attorney, Agent, or Firm*—Curtis, Morris & Safford

[57] ABSTRACT

An adjusting automobile suspension system providing a controlled camber response to the attitude of a vehicle, the forces acting on such vehicle and/or the type of road surface for example when the vehicle is navigating a turn and/or accelerating or braking. The system includes sensors that monitor the magnitude of centrifugal and vertical forces on the vehicle, the direction and degree that the steering wheel is being turned, the magnitude of longitudinal forces acting on the vehicle, the individual rotational wheel speed at each wheel of the vehicle and camber of each wheel with respect to the vehicle body. In response to the sensed change in the vehicle's attitude, the sensed forces acting upon such vehicle, and/or the type of road surface monitored by a central control processor, a series of servo mechanisms are activated to alter the camber of each wheel to optimize tire contact with the road surface, as well as to adjust other suspension parameters (toe-in/toe-out caster, wheel height, wheel track) of each wheel due to mechanical misconfigurations that become inherent in certain suspension designs when servo-mechanisms alter the camber of each wheel.

18 Claims, 14 Drawing Figures

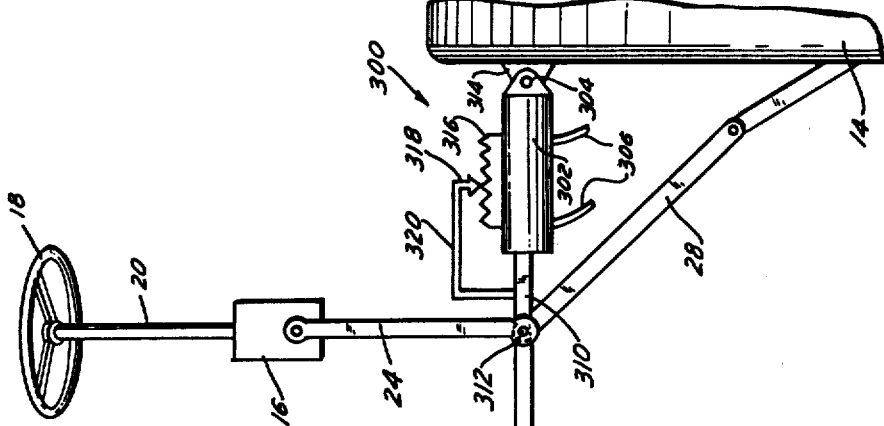
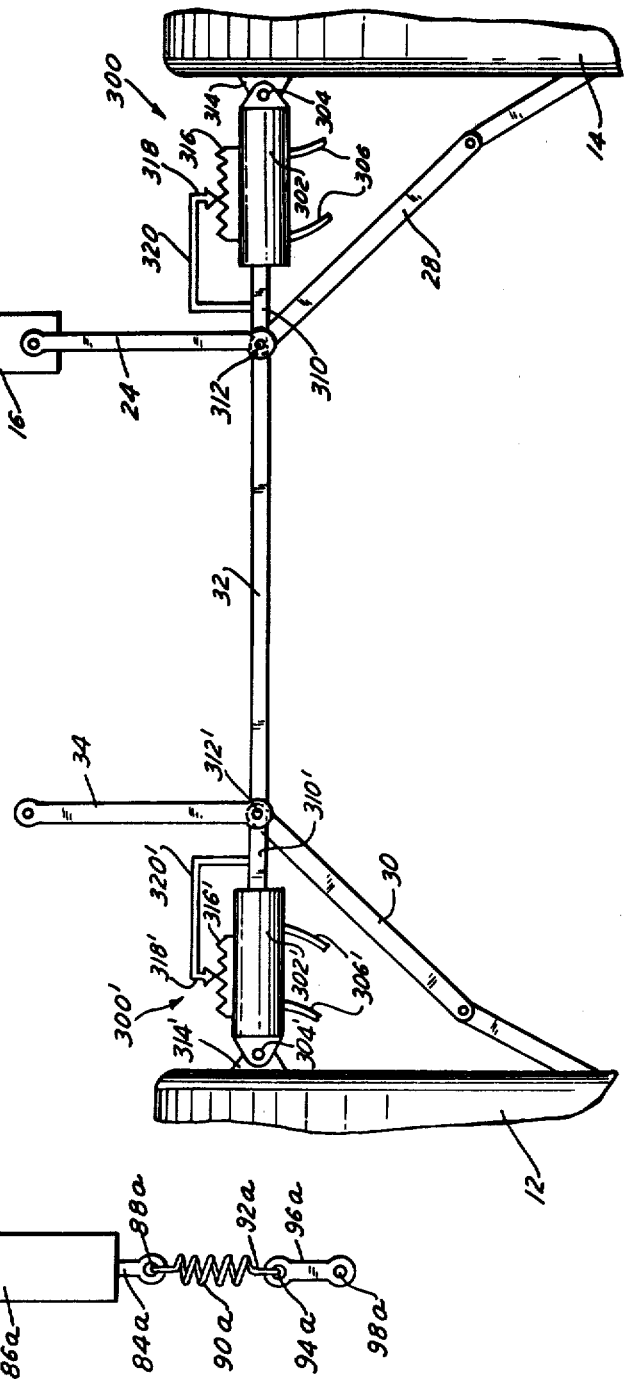
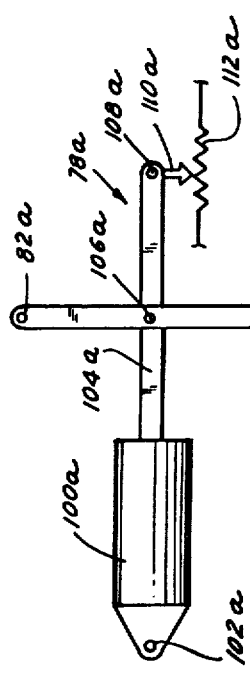

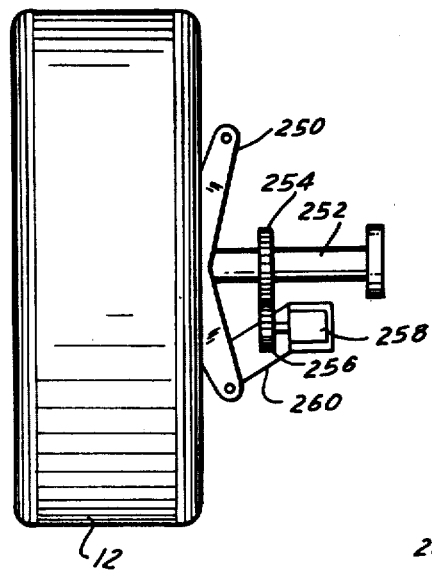
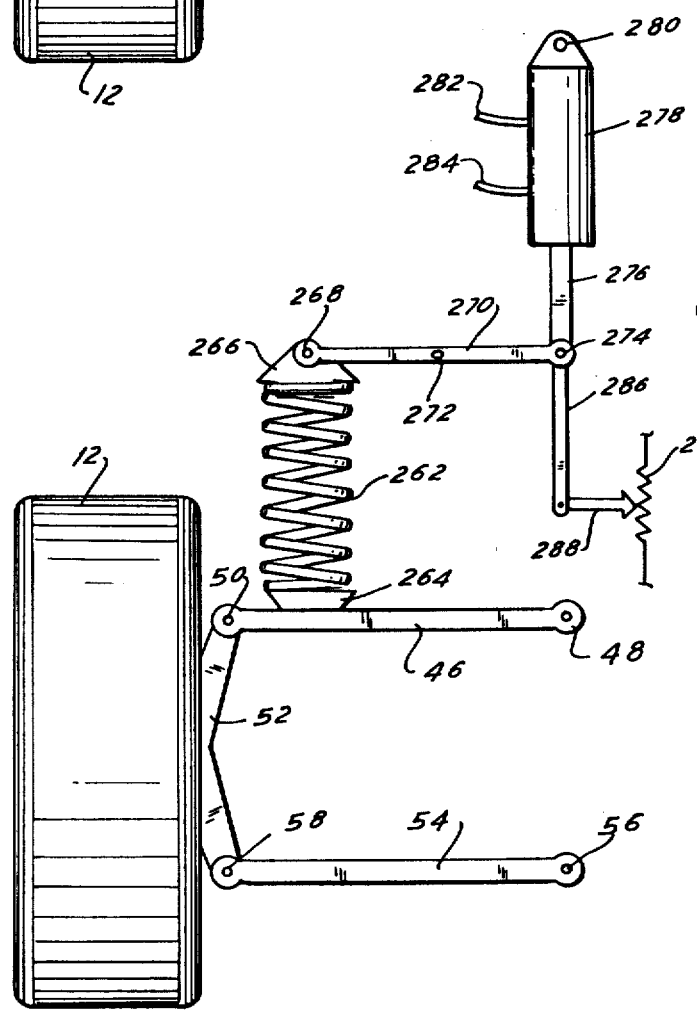

ADJUSTING AUTOMOBILE SUSPENSION SYSTEM

BACKGROUND OF THE INVENTION

This application is a continuation-in-part of copending application Ser. No. 826,709, filed Aug. 22, 1977, now U.S. Pat. No. 4,191,274.

FIELD OF THE INVENTION

This invention relates generally to automobile suspension systems, and more particularly is directed to an adjusting automobile suspension system responsive to sensed attitude changes of the vehicle and force changes acting upon such vehicle. Responsive to the sensed changes, the adjusting suspension system of the present invention changes the camber of the wheels to optimize tire contact with the road surface, optimize traction (grip), optimize controllability and/or maneuverability, especially when the vehicle is navigating a turn and/or accelerating or braking. Additionally, other suspension parameters are altered in conjunction with such camber adjustments.

DESCRIPTION OF THE PRIOR ART

Modern day mechanical automobile suspension systems are of such design that when the vehicle rolls, pitches and/or hits bumps or dips in the road, as when turning and/or accelerating or braking, the degree of road surface contact attainable at each wheel is less than optimum for optimum traction, controllability and maneuverability. Various suspension systems have been devised to overcome the tendency of a vehicle to roll and/or pitch when navigating a turn and/or accelerating or braking. Some of these systems attempt to overcome the roll and/or pitch tendency imparted to the vehicle body due to centrifugal and longitudinal forces by correcting or compensating for the tendency of the vehicle body to roll and/or pitch. While such systems provide a sense of a level ride to the occupants of the vehicle, no correction is made to the position of the tires with respect to the road so that tire contact with the road when a vehicle is navigating a turn and/or accelerating or braking is not at its optimum value. Various suspension systems have been devised that include anti-roll and anti-pitch (anti-squat/anti-dive) features. Some such systems rely on stiff springs to overcome the tendency of the vehicle to pitch or roll. Such systems compromise occupant comfort especially on bumps, dips and road irregularities. Furthermore, stiff springs compromise compliance of the tires to the road surface, lessening traction, maneuverability and controllability of the vehicle. Some such suspension systems rely on anti-roll bars to limit body roll. These static anti-roll bars also present a compromise when bumps are encountered. They also affect wheel height and dynamic load transfer distributions between wheels; affecting traction, maneuverability and controllability. Some suspension systems rely on anti-dive and anti-squat geometries to overcome body pitch. These systems compromise on occupant comfort as well as tire compliance.

Other systems have been proposed which control the tilt of all four wheels equally. Such systems do not account for the fact that each wheel of the vehicle is, in most cases, loaded with a different force and weight distribution and do not require the same degree of tilt so that the corrections to the camber provided by such types of uniform camber adjustment suspension systems do not fully optimize the degree of contact between the road surface and tires of the vehicle. Another disadvantage to such suspension systems is that road surface irregularities, i.e., a bump in the road, can activate the tilt mechanisms of such suspension systems and initiate a correction when no correction is required.

SUMMARY OF THE INVENTION

The basic requirement of any automobile suspension system is to cushion the vehicle from irregularities in the road surface, such as bumps and dips, and to control the attitude of the tires in such a way that the tire tread surface is always in optimum contact with the road surface while concurrently allowing the vehicle to be controlled by the driver with maximum ease during transient and steady state conditions. The average passenger automobile suspension represents a compromise between maximum comfort, controllability, maneuverability and optimum tire contact with the road. As a vehicle rolls and/or pitches when negotiating turns and/or braking or accelerating, the angular relationships between the tire treads and the road surface is less than optimum. Furthermore, the nature of the modern automobile tire is such that when a lateral force is applied to it, as in a turn, the tire tread tends to tuck under or roll slightly. Thus, if an automobile were to make a left turn while traveling at a sufficient speed, the right tire would roll in such a way that the left side of its tread would lift off the road surface unless corrective action to compensate for this tendency were employed. These principles are taken into consideration by most modern automobile suspensions but none of these systems can effectively control all four tires of the automobile simultaneously.

It is therefore clear that an ideal suspension would be one that could keep all four tire treads in optimum contact with the road surface at all times while not being so heavy or complicated as to be impractical and at the same time afford the passengers in the vehicle maximum comfort under all driving conditions.

The factors which act on any vehicle, reduced to simplest form, are lateral, longitudinal and vertical forces. Thus, it is evident that any time the vehicle changes from a straight ahead attitude at a constant velocity on a flat, unbanked surface, the lateral and vertical forces imposed on the vehicle will change. It is also evident that under certain conditions, i.e. acceleration and braking, that longitudinal forces imposed on the vehicle will also change. The vertical and horizontal forces acting on the vehicle are different at each wheel of the vehicle. This is due to the fact that when a vehicle navigates a turn, the longitudinal centrum of gravity shifts toward the outside of the vehicle. When a vehicle accelerates or decelerates, the lateral centrum of gravity shifts. In some cases, especially where the vehicle is navigating a turn at a high rate of speed, the tires on the inside of the car may be literally picked up off the road surface. While this occurs very rarely, it does demonstrate the significant difference in vertical force components acting on each side of the vehicle. In certain cases the longitudinal forces on each wheel are also different due to different braking or accelerating forces imparted to each wheel in braking or other speed change situations.

Lateral forces acting on a vehicle are essentially a function of the centrifugal force created when the vehicle negotiates a turn. The degree of lateral force (cornering traction) acting on each tire is a function of vertical force on that tire and centrifugal force. In the extreme case, where the inside tires of a vehicle leave the ground, it is evident that there would be no lateral forces on those tires because of the absence of any vertical forces. This situation clearly demonstrates that the forces acting on one side of a vehicle during a turn are quite different from the forces acting on the other side.

The front and rear of the vehicle also experience different vertical forces due to power accelerations and braking decelerations. The longitudinal forces acting on the vehicle manifest different vertical forces at the front and rear. The net result is that each wheel of the vehicle will experience a unique set of force parameters; lateral, longitudinal and vertical. Accordingly it becomes desirable to provide in a suspension system means to sense these forces acting upon the vehicle and combine them with other constant equations and parameters, such that the resultant vector of these forces at each wheel can broadly define the optimum contact relationship between the tread surface and the road surface. Furthermore, these parameters can be used to ascertain bumps of short duration from body roll.

Some of the purposes for sensing longitudinal forces is to obtain additional, more accurate and redundant information relating to load distributions on the vehicle for example, longitudinal force helps ascertain static weight distribution fore and aft, and when the vehicle is accelerating under power or decelerating under braking. In certain cases, i.e. combined cornering and acceleration, the use of longitudinal force as a sensed parameter allows the recalculation of the optimum tire attitude such that longitudinal slippage may be affected. A further object for sensing longitudinal force is to further ascertain a bump condition encountered by both front or both rear wheels simultaneously as differentiated from an acceleration or deceleration.

It is also desirable to provide in a suspension system, means to sense additional changes in attitude of a vehicle and relationship of the tires to the road surface such as degree and direction of the steering wheel and the rotational speed of each wheel. The rotational speed sensors, when combined with other sensed parameters, can ascertain deviations (i.e. when a vehicle traverses a turn, inside wheels and outside wheels travel different distances) and can also ascertain wheel rotational slippage during power acceleration and braking such that wheel attitudes can be optimized based on this information. For example, camber change might be desired to affect longitudinal fraction.

These parameters, when combined with the aformentioned vertical, lateral and longitudinal parameters can define, among other things, the coefficient of friction of the road surface to the tread surface, whether the vehicle is in a skid attitude and the actual limit of traction. These factors will further refine the dynamically optimum values of wheel camber at each wheel and furthermore can be used to ascertain the rate of change desired to change camber at each wheel consistent with neutral transient handling characteristics. Furthermore, the steering wheel parameter can be used a a correction factor since, due to ball joint inclinations and castor settings, the camber of a steered wheel will, in most cases, change value as it is steered.

In certain cases, the above sensors provide effectively redundant information to other sensors, or combinations of sensors in conjunction with constant values and parameters. In certain cases, for example, the centrifugal force information is redundant to that provided by the wheel height sensors (vertical force sensors). In certain cases, the combination of centrifugal force information and longitudinal force information can produce redundant information to that of the wheel height sensor information (i.e. dynamic weight distribution at each wheel using constants as spring rates).

Effective suspension designs can be accomplished by using combinations of the above sensed parameters without using all of them. Certain values which are measured can be effectively calculated through the use of constant relationships and parameter value curves. The combination of vehicle speed information steering wheel angle information and longitudinal force information alone, can produce effective values for adjusting wheel attitude when used in combination with preprogrammed relationships, for example, a race car on a flat track without many bumps.

The modern day automotive tire is constructed in such a manner that it can withstand a fixed amount of lateral force for a certain vertical force acting upon it without losing traction. This relationship is also true for longitudinal force (rotational traction). However, when both lateral and longitudinal forces are acting upon a tire (i.e. accelerating out of a turn, braking into a turn), the correlation of lateral and longitudinal forces becomes a vectoral sum whose effective set of values is limited primarily by vertical forces on the tire, the surface conditions, and the angular attitude of the tire with relation to the surface. This limited set of effective values is commonly known as the "traction circle" or "traction envelope". To maximize the area enclosed by this envelope, the camber of the tire must be at optimum value for each value of vertical force, toe/in-out, road surface, as well as for each value of the enclosed resultant force vector. If the force vectors leave the confines of its envelope, the slip angle (for lateral forces) and/or the slip ratio (for longitudinal forces) exceed their maximum values. These values of slip angles and slip ratios can be defined from the correlation of steering wheel angle and lateral force and the correlation of longitudinal force and comparative wheel rotational speeds as compared to the maximum values that are constant with the particular tire used.

It again should be noted that the "traction envelope" is different for each wheel of the vehicle under most conditions and is constantly changing. Adding the vectors in all four of these "envelopes" will net a total envelope and force vectors for the vehicle. Tire attitude control directly affects the dimensions of the envelopes.

In accordance with the previous discussion, the parameters necessary and desirable to control camber at each wheel of a vehicle can be defined and correlated to obtain optimum traction for cornering and/or braking or accelerating, optimum controllability, maneuverability and occupant comfort.

To accomplish this desired result, the adjusting suspension system of the present invention provides a number of basic elements. The first element consists of a group of sensors that monitor the forces acting on the vehicle (longitudinal and horizontal forces) the direction and degree that the steering wheel is turned, the relative height of each wheel with respect to the vehicle body, the rotational speed of each wheel, and the camber of each wheel with respect to the vehicle body.

A second subsystem of the present invention includes a central processing unit which coordinates the signals from the various sensing means reading the sensed variations of the vehicle due to vertical, longitudinal and horizontal forces, change in steering attitude and rotational wheel speeds. This central processing unit correlates the signal received and in turn sends out signals to an adjusting mechanism at each wheel to cause an adjustment to be made to that wheel's camber. The adjustment is made by servo mechanisms associated with each wheel which, in response to the signals sent out by the central processor, controls a hydraulic or similar actuation member to effect changes in the camber of each wheel responsive to the signals generated.

A further object of the suspension system is to correct for mechanical misconfigurations in parameters of toe-in/toe-out, wheel caster angle, wheel track and wheel height/spring rate that become inherent in certain suspension designs when servo-control means alter camber according to the present application. It is the present intent to correct for these ancillary changes for the purpose of correcting the difference between their normal parameters and those parameters imparted to them by the servo-control means controlling camber. This end may be accomplished either through strictly mechanical means operative simultaneously with camber servo-control means (i.e. via direct linkage, bell-crank, etc.) and/or by additional feedback servo-control means.

The main object of employing correction means for parameters affected by the camber servo-control means is that when the above-described suspension system is used on certain existing suspension designs, mechanical misconfigurations of certain parameters can not be avoided. An example of this would occur in a McPherson or Chapman strut-type design. If the servos controlling camber were employed to move the top of the strut laterally, the spring compression would change as the servo was moved. The top of the strut would describe an arc in relation to the road as it was moved laterally. The track of the wheel with relation to the chassis would also change.

Still another part of the suspension system of the present invention is a means to check on the operability of the other four systems so that if any malfunction occurs in any one of the other systems the control system is deactivated to allow the suspension system to behave as a normally suspended vehicle without the adjusting feature. The resulting suspension system places the vehicle wheels at the optimum angle of camber in response to any change in the attitude of the vehicle changes in forces acting upon the vehicle and/or road surface.

Accordingly, it is an object of the present invention to provide a vehicle suspension system to control suspension geometry responsive to sensed variations in vertical, longitudinal and lateral forces acting on the vehicle, steering wheel position and rotation speed of each wheel.

It is a further object of the present invention to provide an automatically adjustable vehicle suspension system to optimize road surface contact of the vehicle tires under all conditions of vehicle operation.

It is a still further object of the present invention to provide an automatically adjustable vehicle suspension system to adjust the camber and other suspension parameters of each wheel of the vehicle independently of the others in response to sensed changes in the vehicle attitude, sensed changes in forces acting upon the vehicle, and/or computed changes in contact surface condition in order to optimize contact between the road surface and each individual wheel at a specific rate of change and degree in order to optimize traction, vehicle controllability, vehicle maneuverability and/or occupant comfort.

The above, and other objects, features and advantages of this invention, will be apparent in the following detailed description of an illustrative embodiment which is to be read in connection with the accompanying drawings.

BRIEF DESCRIPTION OF THE DRAWINGS

FIG. 7 is a diagrammatic representation of the mechanism employed to sense longitudinal force acting on the vehicle;

FIG. 8 is a diagrammatic representation of the mechanism employed to sense speed of rotation of each wheel of the vehicle;

FIG. 9 is a diagrammatic representation of a typical wheel assembly illustrating a mechanism to adjust each individual wheel height with respect to the vehicle chassis and a sensing mechanism to indicate the relative position of the wheel height adjusting mechanism;

FIG. 10 is a diagrammatic representation of the front wheels and steering mechanism of a vehicle to illustrate a mechanism to control toe-in and toe-out of the front wheels;

DETAILED DESCRIPTION OF A PREFERRED EMBODIMENT

Figure 1:
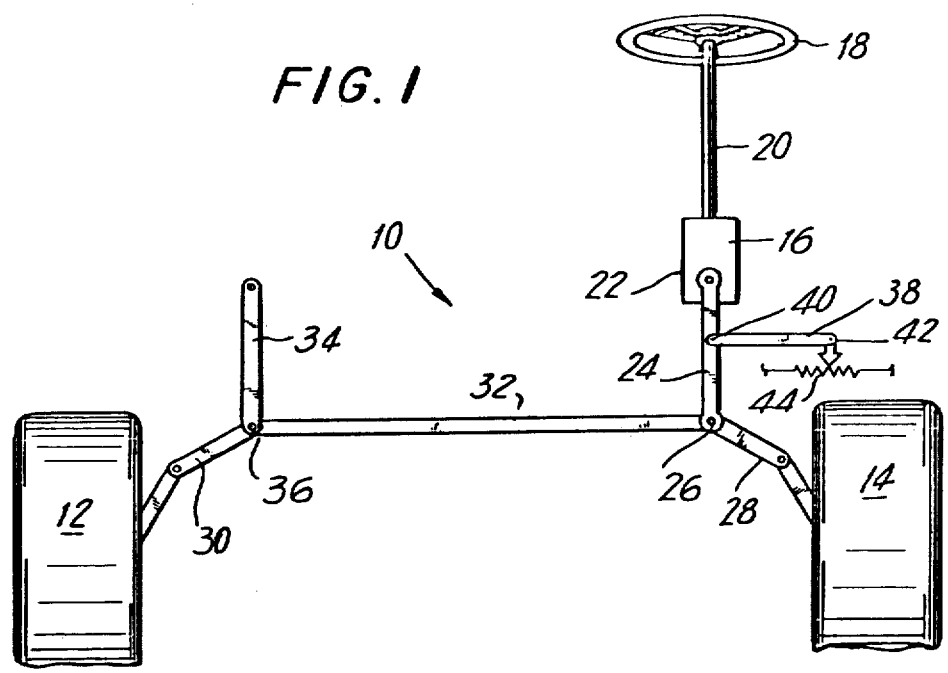
FIG. 1 is a diagrammatic representation of the front wheels and steering mechanism of an automobile to illustrate the manner in which the adjusting suspension system of the present invention senses vehicle turning.

In the drawings, FIGS. 1 to 6 represent the invention described in the above-mentioned co-pending application. FIGS. 7 to 14 relate to additional aspects of the invention which can be individually or collectively combined with the features disclosed in FIGS. 1 to 6 to provide a vehicle suspension system which is more responsive to sensed attitude changes and sensed force changes on a vehicle and calculated road surface changes to provide a greater degree of vehicle control and stability. Because of the interrelationship of the various additional attitude and force sensors described herein with the basic invention disclosed in the above-mentioned co-pending application the present invention will be described in conjunction with that prior disclosure for completeness and greater ease in understanding.

Figure 2:
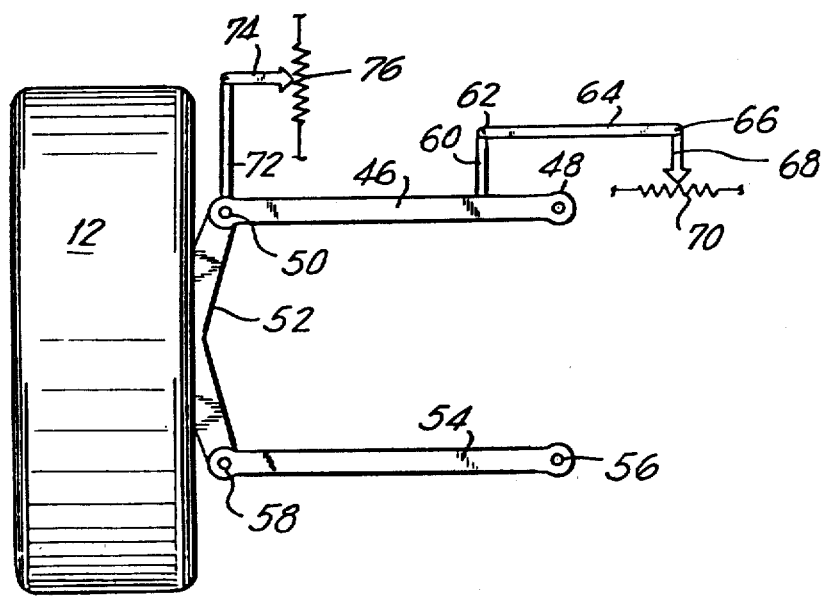
FIG. 2 is a diagrammatic representation of an automobile wheel and suspension to illustrate the manner in which the adjusting suspension system of the present invention senses changes in wheel camber and vertical displacement with respect to the vehicle body.
Figure 3:
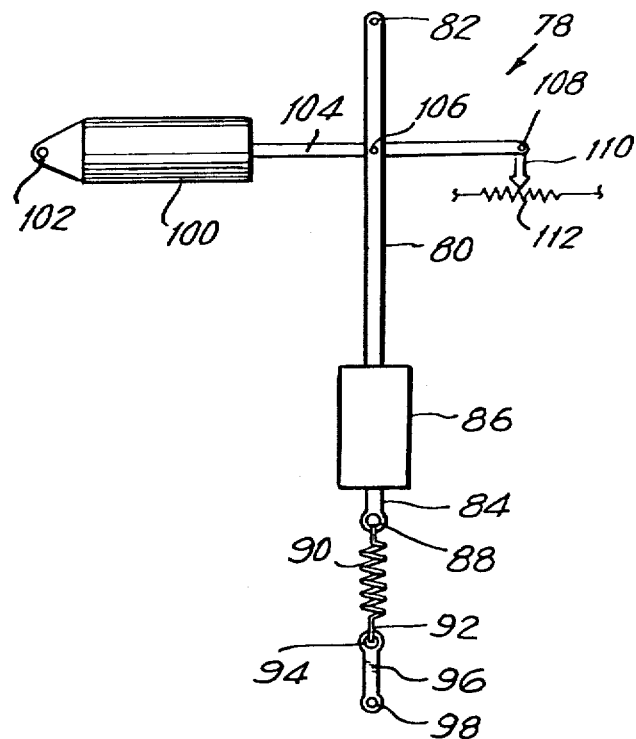
FIG. 3 is a diagrammatic representation of the mechanism employed to sense centrifugal force acting on the vehicle.

Referring to the drawings, and initially to FIGS. 1 through 3 thereof, there are shown diagrammatic representations of a portion of the adjusting suspension system 10 in accordance with the present invention. Illustrated in FIG. 1 are front wheels 12 and 14 of a typical automobile vehicle and a steering assembly 16. The steering assembly, which may be a conventional automobile steering assembly, includes steering wheel 18, steering column 20 and steering box 22 which controls the output of pitman arm 24. The pitman arm 24 is pivotally linked, as at 26, to the vehicle left front wheel 14 through steering linkage 28 and to the steering linkage 30 for the vehicle right side wheel 12 by drag link 32. An idler arm 34 is also pivotally linked, as at 36, to drag link 32 and right side steering linkage 30.

According to the present invention, information as to the attitude of the steering wheel is supplied to the central control processor and, accordingly, means are provided to sense changes in the steering attitude of the vehicle. To accomplish this, a linkage member 38 is provided having one end 40 linked to pitman arm 24 and its other end having a control arm 42 extending therefrom in wiping engagement with a variable resistor 44. Thus as the vehicle is steered through a turn the corresponding movement of pitman arm 24 of the steering assembly causes movement of control arm 42 along variable resistance 44. This provides an indication of the relative position of the steering wheel attitude by reason of the change in voltage drop sensed across variable resistance 44. Thus changes in voltage drop are correlated to the degree of turning of the steering wheel as well as actual angular position of each steered wheel.

Referring now more particularly to FIG. 2, a typical wheel assembly is illustrated along with a means to measure the effect of vertical forces acting on the vehicle at that wheel and to also provide an indication as to the camber attitude of the wheel. Each of the four wheels of the vehicle are provided with an assembly similar to that shown in FIG. 2. Thus, as shown, each wheel assembly includes an upper control arm 46 secured at one end 48 to a movable actuation member, to be described hereinbelow, and at its other end 50 pivotally connected to the upper end of a spindle 52. A lower control arm 54 is also provided having one end 56 fixed to the vehicle chassis (not shown) and its other end 58 pivotally connected to the lower end of spindle 52.

To indicate the camber attitude of wheel 12 an arm 60 is provided fixed to upper control arm 46. Arm 60 is pivotally linked, as at 62, to one end of a linkage member 64 which is in turn pivotally linked at its other end, as at 66, to a control arm 68 in operative wiping engagement with a variable resistor 70. Thus as the camber of wheel 12 is changed (as in FIG. 4), upper control arm 46 will move correspondingly causing a corresponding movement in control arm 68 across the variable resistor 70. Variations in the sensed voltage drop across variable resistor 70 may then be correlated with the change in the camber attitude of the wheel with respect to the chassis. This information is sent to the central control processor of the present invention as will be explained more fully hereinbelow.

To sense the effects of vertical forces acting on the vehicle, one end of a linkage 72 is provided fixed to end 50 of upper control arm 46. A control arm 74 extends from the other end of linkage 72 and is in wiping engagement with a variable resistor 76 fixed to the vehicle chassis. Thus, as vertical forces are imparted to the vehicle, for example due to a bumpy road or due to the vehicle navigating a turn, the degree of relative displacement between the wheel and the chassis may be determined through a correlation of the change in the sensed voltage across variable resistor 76. As with the sensed voltage across variable resistors 44 and 70 the change in voltage across variable resistor 76 is fed to the central control processor of the present invention.

Reference is now made to FIG. 3 which diagrammatically illustrates a mechanism 78 to sense when the vehicle is subjected to centrifugal forces. Mechanism 78 is preferrably located along the longitudinal axis of the vehicle and includes a central linkage arm 80 pivotally secured at one end 82 to the vehicle chassis. A weight 86 is provided on linkage arm 80 adjacent its other end 84. End 84 is connected to one end 88 of a centering spring member 90. The other end 92 of centering spring 90 is hooked to one end 94 of a linkage member 96 with The other end 98 of linkage member 96 being pivotally fixed to the vehicle chassis. A hydraulic damper 100 is also provided having one end 102 pivotally fixed to the vehicle chassis with an extending damping rod 104 being pivotally connected, as at 106, along a midpoint of rod 104 to rod member 80. The free end 108 of rod member 104 includes an extending control arm 110 in wiping engagement with a variable resistor 112. It is thus evident that as the vehicle navigates a turn centrifugal forces are imparted to the vehicle and act on weight 86 tending to displace weight 86 outwardly with respect to the direction of the vehicle turn. This displacement results in a movement of extending rod 104 of damper 100 changing the position of control arm 110 in engagement with variable resistor 112 which provides a sensed voltage variation in the same manner as the sensed voltage variation of variable resistors 44, 70 and 76. This sensed voltage variation is also fed to the central control processor of the present invention.

Figure 4:
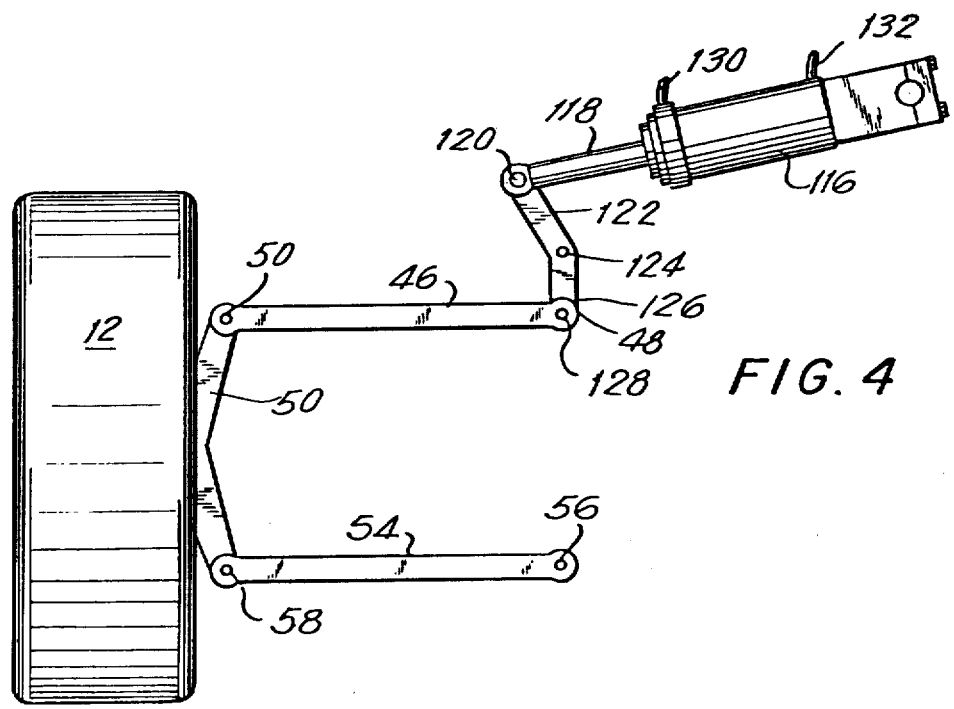
FIG. 4 is a diagrammatic representation of a vehicle wheel and suspension showing one embodiment of the interconnection of a hydraulic servo mechanism in order to control wheel camber.
Figure 5:
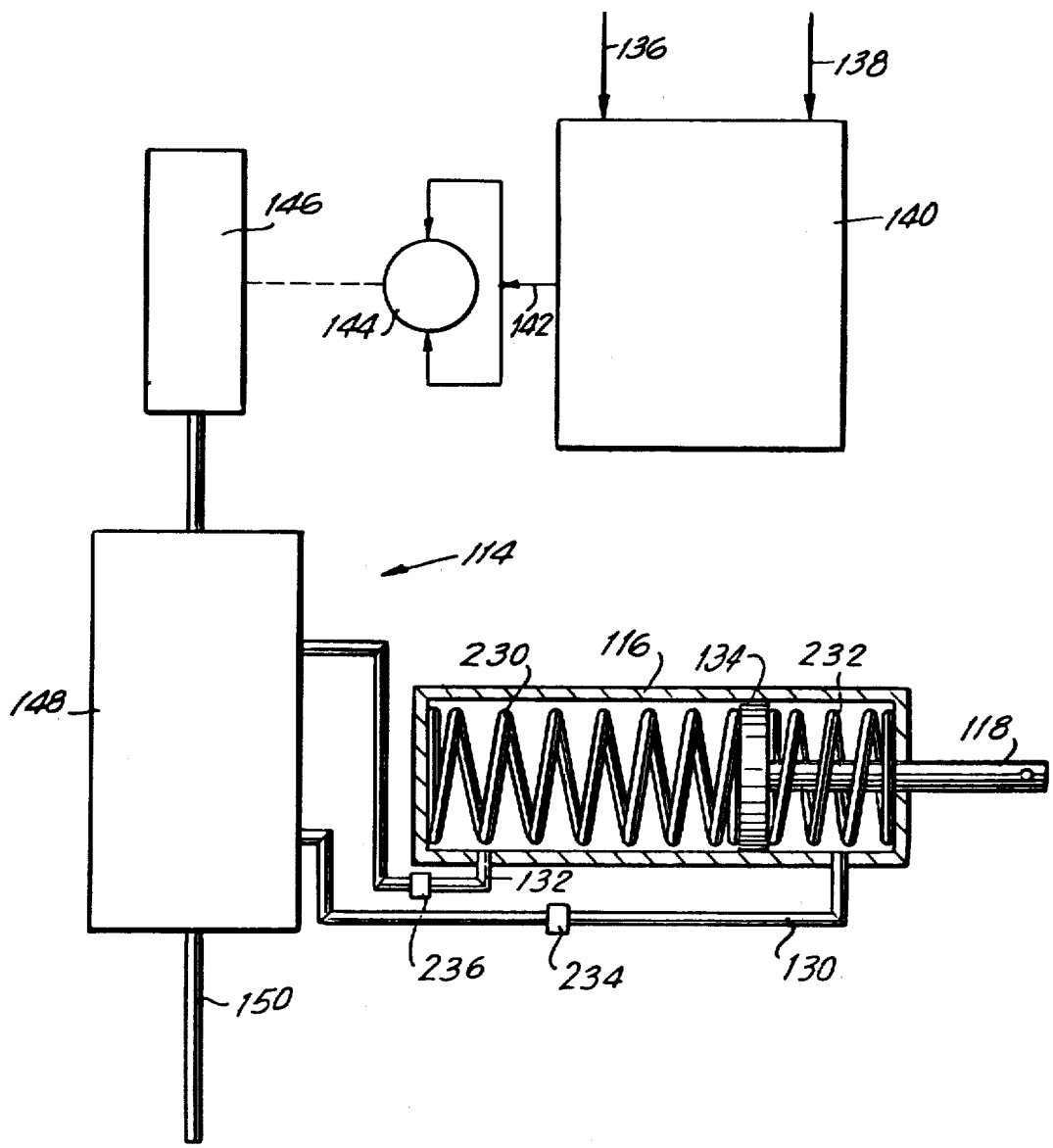
FIG. 5 is a diagrammatic representation of the servo control system of the present invention.

With reference now to FIGS. 4 and 5, a preferred camber adjusting assembly 114 is shown. Assembly 114 is responsive to signals received from the central control processor and adjusts the camber of each individual wheel according to the predetermined camber to maintain optimum road surface contact between the tire tread and the road as dictated by the sensed attitude of the vehicle, sensed forces acting upon the vehicle and road surface condition. The camber control assembly 114 includes a hydraulic cylinder 116 pivotally fixed to the vehicle chassis having an extendable and retractable piston extension arm 118 pivotally linked at its free end, as at 120, to a linkage member 122. Linkage member 122 is a crank arm pivotally mounted at some intermediate point 124 to the vehicle chassis and having its end 126 pivotally secured, as at 128, to end 48 of upper control arm 46. Hydraulic hoses 130 and 132 deliver incompressible hydraulic fluid under pressure to opposite sides of the piston 134 (see FIG. 5) of hydraulic cylinder 116 to extend and retract piston extension arm member 118. With hydraulic fluid entering cylinder 116 through hose 132 piston arm 118 extends moving the upper control arm 46 to the right, as viewed in FIG. 4, thereby adjusting the camber of wheel 12 to one where the wheel is inclined toward the right. Hydraulic fluid supplied through line 130 causes piston arm 118 to retract and, consequently, move upper control arm 46 to the left to adjust the chamber of wheel 12 so that the wheel inclines to the left.

Adjustment of the camber of any of the wheels of the vehicle is made responsive to signals received from the central control processor. As best shown in FIG. 5, an input signal, indicated at 136, and a feedback signal, indicated at 138, generated by the change in voltage across the variable resistor 70 feed into a servo drive amplifier 140. The servo drive amplifier 140 includes circuitry that balances inputs of the two signals and has an output signal indicated at 142 which drives a DC motor 144 connected to a gear reduction unit 146 to drive a hydraulic control valve assembly 148. The control valve assembly 148 controls hydraulic fluid under pressure received from an input 150 and diverts it to either of the hydraulic fluid lines 130 or 132 to activate hydraulic cylinder 116 for adjustment of the camber of wheel 12.

Servo drive amplifier 140, in effect, balances the input signal from the central processor, 136, and the feedback signal generated by variable resistor 70, transmitted through 138, to operate the motor 144 to move upper control arm 146 until the signal fed back through feedback 138 equals the signal fed by 136 sent from the central control processor.

Figure 6:
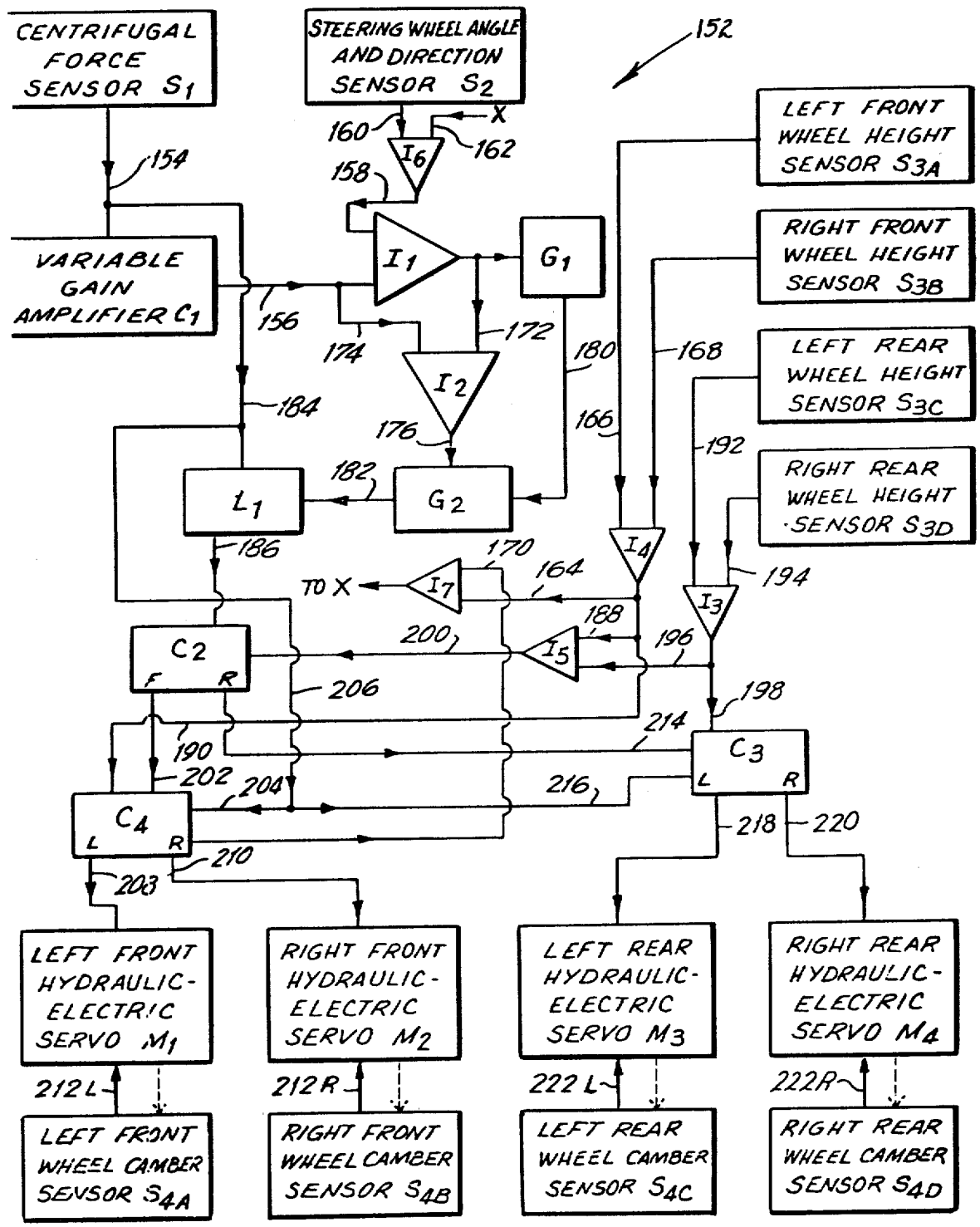
FIG. 6 is a block diagram showing the input and output to the central information processor of the present invention.

Reference is now made of FIG. 6 for a block diagram of the central control processor indicated generally by 152. As indicated above, variable resistors 76 at each wheel of the vehicle, 44 associated with the steering column and 112 which senses centrifugal force on the vehicle, produce a signal responsive to the respective sensed attitude and all send these signals to the central control processor 152. The centrifugal force sensor is shown in the block diagram as $S_1$, the steering wheel angle and direction sensor shown as $S_2$ and the left front wheel height sensor, right front wheel height sensor, left rear wheel height sensor and right rear wheel height sensor are shown as $S_{3A}$, $S_{3B}$, $S_{3C}$, and $S_{3D}$, respectively. All of the sensors and circuitry use a regulated power supply that not only provides a constant voltage but also filters out any interference present in the vehicle's electrical system.

The signal from the centrifugal force sensor $S_1$, the main source of information as most camber corrections are necessitated because of the vehicle navigating a turn, and indicated at 154, is fed to a variable gain amplifier $C_1$. The output of amplifier $C_1$, indicated at 156, is fed into an integrator $I_1$. Integrator $I_1$ also receives a combined signal from an integrator $I_6$, shown at 158, which is an integrated signal derived from steering wheel angle and direction sensor $S_2$, shown at 160, and an integrated signal from an integrator $I_7$, shown at 162. Integrator $I_7$ in turn receives an integrated signal generated from an integrator $I_4$, shown at 164. Integrator $I_4$ receives signals generated by the left front wheel height sensor $S_{3A}$, shown at 166, and a signal from the right front wheel height sensor $S_{3B}$, shown at 168. Integrator $I_7$ also receives a signal, shown at 170, which is a feedback signal from a double integrator $C_4$, as will be explained more fully hereinbelow.

Thus, the output from integrator $I_1$, a combination of signals representing indications of a change in turning attitude of the vehicle, feed to an integrator $I_2$, as shown at 172. The output of amplifier $C_1$ is zero when there is no centrifugal force acting on the vehicle and the output swings positive or negative depending on the direction of the turn and is proportional to the amount of centrifugal force acting on the vehicle. In like manner, the output of steering wheel angle and direction sensor $S_2$ is zero when the steering wheel of the vehicle is in the straight ahead position and swings positive or negative as the wheel is turned left or right in an amount proportional to the change in the steering wheel angle. As the car turns in one direction, the output of amplifier $C_1$ and $I_6$ will be of the same polarity. In essence, the output of integrator $I_1$ represents an error signal that is greater when the steering wheel must be turned more than normal to obtain a given centrifugal force, for example, on a gravel road $I_1$ will generate an error signal while on a hard paved road, the error would be essentially zero.

The output of amplifier $C_1$ through line 174 and the output from integrator $I_1$ through line 172 are fed into integrator $I_2$. The output of integrator $I_2$, shown at 176, yields a value for wheel camber which takes into consideration the type of road surface the vehicle is driving on. The error signal from integrator $I_1$, shown at 178, feeds into a threshold detector or trigger $G_1$ with an output 180 feeding a gating circuit $G_2$. The output from integrator $I_2$ also feeds into gating circuit $G_2$. In essence, gating threshold detector $G_1$ senses if the output from the integrator $I_1$ is very great and if it is, causes the output of gating circuit $G_2$ to be zero. Otherwise, the output from gating circuit $G_2$, shown at 182, is the same as the output from integrator $I_2$. Some conditions which would cause the output of gating circuit $G_2$ to be zero would result if the vehicle were to be navigating a turn very slowly so that the centrifugal force imparted to the vehicle was negligible, or if the car were steering out of control, as in a skid. In both cases, the zero output of gating circuit $G_2$ would call for a predetermined camber of the wheel.

The output from $G_2$, as well as the signal from centrifugal force sensor $S_1$, shown at 184, feed into a gated latch circuit $L_1$ which acts as a latch-memory. The output from $L_1$, shown at 186, is the output exactly as it comes from the output of $G_2$ unless the latch-memory $L_1$ senses a rapid change in the signal from $S_1$. Thus, as long as the signal from $S_1$ is uniform, $L_1$ outputs the same signal received from $G_2$. In the event the signal from $S_1$ indicates a rapid change, for example, such an occurrence is possible if the weight 86 in the centrifugal force sensor were distrubed as might be the case if the vehicle hit a large bump, the latch-memory $L_1$ retains the output last received from $G_2$ and continues to output this signal rather than the rapid change signal received from sensor $S_1$. Rapid changes in centrifugal force sensed also may occur as the vehicle swerves rapidly from a straight line path, for example, to avoid an impediment in the raod, and then resumes a straight ahead path. Latch-memory $L_1$ provides a delay to the response to such rapid changes in centrifugal force and maintains the normal output received from $G_2$ for a sufficient time so that any abrupt changes in centrifugal force do not initiate a response to change wheel camber. Thus, the output of $L_1$ respresents a value that if properly interpreted is correlated to the degree of wheel camber required at each wheel with respect to the road for the driving conditions sensed.

The signals generated from the height sensors, $S_{3A}$, $S_{3B}$, $S_{3C}$ and $S_{3D}$, provide an indication of load imbalance in the vehicle as well as an indication of vehicle turning. This is so because the roll imparted to the vehicle during a turn will alter the vertical orientation of the vehicle's chassis with respect to the wheels. Thus, as noted above, signals from the front wheel sensors $S_{3A}$ and $S_{3B}$ are received by integrator $I_4$. The output from $I_4$ is fed to an integrator $I_7$, as at 164, as well as to an integrator $I_5$, as at 188, and to a gated memory integrator $C_4$, as at 190. Signals from the rear wheel height sensors $S_{3C}$ and $S_{3D}$ are received at an integrator $I_3$, through 192 and 194, respectively, and the output of integrator $I_3$ is sent to integrator $I_5$, as at 196, and to a gated memory integrator $C_3$, as at 198. The output from integrator $I_5$, shown at 200, is the second input to double integrator $C_2$ and this input along with the input from latch memory $L_1$, shown at 186, are the two signals provided to double integrator $C_2$. In essence, the integrated signal, at 200, coming from integrator $I_5$ provides an indication of load distribution in the vehicle as well as an indication of vehicle roll as it navigates a turn. Thus, if the trunk of a vehicle were loaded with heavy objects the initial signals sent from rear wheel height sensor $S_{3C}$ and $S_{3D}$ would indicate an uneven load distribution in the vehicle and the output of $I_5$, at 200, fed into double integrator $C_2$ would provide a signal output indicating a desired change in wheel camber, i.e., a different value for the wheel camber than if the vehicle were unloaded. Thus wheel camber is adjusted for load distribution.

One output from double integrator $C_2$, at 202, feeds gated memory integrator $C_4$ which also receives an input, at 204, of a signal directly from centrifugal force sensor $S_1$ through line 206. Thus the input signals 202 and 204, which are integrated signals correlating indications of centrifugal force acting on the vehicle and indications of load distribution in the vehicle as well as indications of turning of the vehicle, respectively, are fed to gated memory integrator $C_4$. The outputs from gated memory integrator $C_4$, at 208 and 210, respectively, are the signals fed to servo drive amplifier 140, as indicated at 136 in FIG. 5. The correlating signal indicated at 212$_L$ and 212$_R$, respectively, is the signal generated by variable resistor 70 at each wheel and provides an indication of the actual camber of the wheel. Thus, as explained above, servo drive amplifier 140 controls the hydraulic cylinder 116 until the input signals 208 and 210 equal the signal returned from wheel camber measurement indicators 212$_L$ and 212$_R$, respectively.

In like manner control of the camber of the rear wheels is accomplished from output signals of gated memory integrator $C_3$ which receives a first input, at 198, from the output of integrator $I_3$ and a second input, at 214, from the output of double integrator $C_2$. In addition, integrator $C_3$ receives a signal, at 216, which is a direct signal from centrifugal force sensor $S_1$. The outputs from gated memory integrator $C_3$, at 218 and 220, go respectively to the left and right rear hydraulic servo units 140 associated with each wheel. As with the servo units controlling the front wheels the feedback signal from the variable resistor 70 associated with each rear wheel is indicated at 222$_R$ and 222$_L$.

Both of the gated memory integrators $C_3$ and $C_4$ receive a signal directly from the centrifugal force sensor $S_1$ and this signal is an error check on the signal received from $S_2$ to indicate whether centrifugal force being sensed by $S_1$ is directly related to steering wheel turn angle, indicating the vehicle is navigating a turn, or whether the centrifugal force signal sensed is due to an extraneous factor or an instantaneous response which does not require correction in wheel camber. In addition, as noted above, one of the outputs from $C_4$, at 170, is provided as an input to integrator $I_7$ and then as an input, at 162, to integrator $I_6$. This signal acts as an error control in that if the vehicle is loaded unevenly left to right, for example, if only the driver is a passenger in the vehicle, this signal will alter the geometry in a predetermined way to provide a base signal upon which further determinations of change in the wheel camber are to be made. In essence, the uneven left to right loading as well as front to rear loading is removed as a factor in consideration for change in wheel camber when changes in wheel camber are indicated by changes in centrifugal force and steering angle.

Each of the gated memory integrators $C_3$ and $C_4$ have three inputs. One input to each comes from integrator $C_2$ which generates an output that represents desired wheel camber for the front and rear based on signals received from $S_1$, centrifugal force sensor, $C_1$, the variable gain amplifier, $S_2$, steering wheel angle and direction sensor, and $I_5$, an integrated signal providing information with respect to front to rear weight distribution. A second input to gated memory integrators $C_3$ and $C_4$ comes from integrators $I_3$ and $I_4$ and provide information with respect to left to right weight distribution for the rear and front of the vehicle, respectively. The third input to gated memory integrators $C_3$ and $C_4$ comes directly from centrifugal force sensor $S_1$.

Gated memory integrators $C_3$ and $C_4$ have a built in memory feature which retains the value of the signal from integrators $I_3$ and $I_4$, respectively, whenever the signal received directly from $S_1$ changes to zero, i.e., an indication that no centrifugal forces are acting on the vehicle. However, whenever the value of the signal from $S_1$ changes from zero, integrators $C_3$ and $C_4$ behave as an ordinary integrator but uses the remembered value of the last signal received from $I_3$ and $I_4$, respectively, that last existed when the signal from $S_1$ was zero. This gated memory operation tends to filter out the effects of bumps and also compensates for static changes in weight distribution in the vehicle due to passenger and/or cargo loading.

As noted above, the adjusting automobile suspension system of the present invention may be designed with a check on the operability of the adjusting system. Thus, if a malfunction occurs, the fail safe system operates to deactivate the adjusting feature of the suspension to allow the vehicle to behave as a non-adjusting standardly suspended vehicle.

The "fail-safe" provision locks out camber adjustment if a problem occurs in the hydraulic system. Suitable controls are present in the central control processor to monitor malfunctions in the electronic systems. For a mechanical override, each of the hydraulic cylinders 116 are provided with an internal spring 230 and 232, respectively, (see FIG. 5) on each side of the piston 134. EAch of the hydraulic lines 130 and 132 are provided with pressure sensing switches 234 and 236, respectively, which sense when hydraulic pressure in these lines falls below a predetermined level. If pressure loss is sensed, switches 234 and 236 respond and disconnect the hydraulic pressurization system so that no hydraulic fluid is supplied.

With an absence of hydraulic fluid, springs 230 and 232 center the piston 134, which is a zero camber for each wheel. Thus wheel camber would be maintained at a neutral position and the vehicle would perform as a standard normally suspended vehicle. With pressurization of the cylinders, the springs do not affect the position of piston 134 so that the cylinders are controlled only by hydraulic pressure.

In addition to the above elements, the present invention contemplates the addition of one or more additional attitude and/or force sensing mechanisms and corresponding wheel adjustments responsive to these additional sensed attitudes and forces which can be individually or collectively used with one or more of the attitude and force sensing and wheel correcting means described heretofore to provide a more accurate and more road responsive vehicle suspension system. In essence, the present invention contemplates use of all the attitude and force sensing means described heretofore with all the attitude and force sensing means to be described hereinafter or, in the alternative, selected combinations of sensed attitude and wheel and vehicle correction means depending on the degree of sophistication for a vehicle suspension system desired.

With reference now to FIGS. 7 to 14, and initially FIG. 7, there is shown diagrammatically a mechanism to sense when the vehicle is subjected to longitudinal forces, i.e., acceleration and braking forces. This mechanism may be the same as the mechanism shown in FIG. 3 for sensing when the vehicle is subjected to centrifugal forces and is shown in FIG. 7 with like reference numerals with the suffix "a". The longitudinal force sensor is offset 90° from the centrifugal force sensor so that the weight 86a is displaced when the vehicle is subjected to longitudinal forces and the movement of weight 86a due to forces acting on the vehicle is sensed by the voltage variation across variable resistor 112a.

Referring now to FIG. 8, there is shown a mechanism to correlate the rotational speed of a wheel 12. Wheel 12 includes a spindle 250 and an axle 252 on which is mounted a gear member 254. A second gear 256 is suitably rotatably supported on the vehicle chassis and is positioned for meshing engagement with axle gear 254. Thus as wheel 12 rotates, gear member 254 also rotates at the same rotational speed as the wheel and that rotation is imparted to gear 256. Gear 256 is operatively connected to a tachometer 258 which is supported on a mounting bracket 260 secured to wheel spindle 250.

Tachometer 258 produces an electrical signal which is proportional to the rotational speed of wheel 12 and that wheel speed signal is fed to the central control processor as will be explained more fully hereinbelow.

FIG. 9 illustrates a typical wheel assembly provided at each wheel of the vehicle to sense the relative height of the vehicle chassis with respect to each wheel and to adjust the wheel height of each wheel with respect to the vehicle chassis. This assembly is similar in many respects to the assembly illustrated in FIGS. 2 and 4 and, thus, like parts are designated by the same reference numerals used in FIGS. 2 and 4.

As shown in FIG. 9, upper control arm 46 is secured at one end 48 to a movable actuation member (not shown) which is the same as the movable actuation member assembly 116 shown in FIG. 4. Its other end 50 is pivotally connected to spindle 52 and wheel 12. The lower control arm 54 has one end 56 fixed to the vehicle chassis (not shown) and its other end 58 pivotally connected to the lower end of spindle 52.

In addition, each wheel assembly includes a coiled compression spring member 262 fixed at one end 264 to upper control arm 46 and at its other end 266 to one end 268 of a second control arm 270. Control arm 270 is pivotally connected at its approximate midpoint 272 to the vehicle chassis (not shown) and at its other end 274 to the extensible and retractable plunger rod 276 of a hydraulically actuated cylinder member 278.

Cylinder 278 is pivotally connected at its end 280 to the vehicle chassis (not shown) and is actuated in the conventional manner by the selective introduction of hydraulic fluid through hydraulic fluid lines 282 and 284 which direct fluid under pressure to either side of the piston member in cylinder 278 to extend or retract plunger rod 276. Plunger rod 276 includes an extending rod portion 286 having a control arm segment 288 extending therefrom in operative wiping engagement with a variable resistor 290 which has a voltage impressed thereacross.

Thus, it is evident that as the wheel height with respect to the chassis is changed, via the operation of cylinder 278, the compression of spring 262 will change and this will effect the position of control arm 288 on variable resistor 290 to effect a change in the voltage across variable resistor 290 which can be correlated to the variation of the wheel height with respect to the vehicle chassis. This information is sent to the central control processor as will be explained more fully hereinbelow to initiate a response by the vehicle suspension system.

With reference now to FIG. 10 there is shown a diagrammatic representation of the front wheels and steering system which is similar to the system illustrated in FIG. 1 with the addition of a mechanism to adjust toe-in and toe-out of the front wheels. Thus, in FIG. 10, like reference numerals designate elements which are the same and function in the same manner as in FIG. 1.

In the embodiment shown in FIG. 10 identical hydraulic cylinder assemblies 300 and 300' are provided to replace control arms 28 and 30, respectively, as shown in FIG. 1, to control toe-in and toe-out of the front wheels 12 and 14. The following description of assembly 300 will also describe the working of assembly 300' where like parts have the same reference numeral indicated with a prime superscript.

Hydraulic assembly 300 includes a hydraulic cylinder member 302 fixed at one end 304 to pitman arm 24 at 26 (cylinder 302' to idler arm 34 at 368) and includes hydraulic fluid lines 306, 308 to direct fluid under pressure to either side of a piston member which has an extensible and retractable plunger rod 310 extending therefrom. Plunger rod 310 has its free end 312 pivotally linked to wheel 14 at steering arm 314 (end 312' to wheel 12 at 314').

Thus when hydraulic fluid under pressure enters cylinder 302 to extend plunger rod 310 the distance between points 26 and 314 (36 and 314') is made greater to move wheels 12 and 14 to a greater degree of toe-out. Similarly when hydraulic fluid under pressure is introduced to cylinder 302 and/or 302' to retract plunger rods 310 and/or 310' wheels 12 and 14 are made to toe-in to a greater degree.

A variable resistor 316 is also provided fixed to cylinder 302 and a control arm 318 in wiping engagement with variable resistor 316 is provided with control arm 318 being linked to plunger rod 310 by a linking arm 320. Thus as plunger rod 310 extends and retracts wiper arm 318 moves along variable resistor 316 to change the voltage drop across the resistor and this change in voltage is proportional to the degree of change in toe-in and toe-out of wheels 12 and 14. This information is sent to the central control processor as will be explained more fully hereinbelow.

Figure 11:
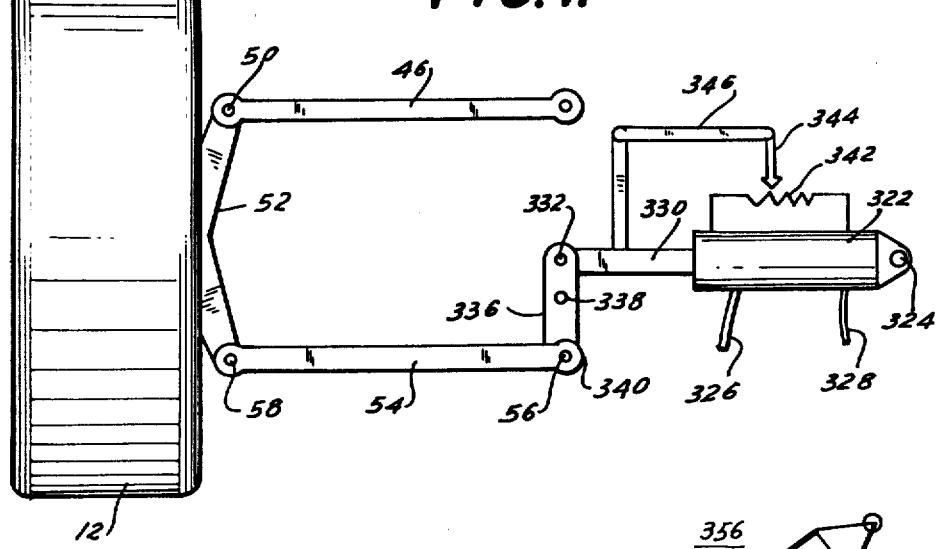
FIG. 11 is a diagrammatic representation of a mechanism to alter wheel track of a vehicle.

Reference is now made to FIG. 11 where an assembly is shown which is provided for each wheel to adjust the width of each of the vehicles' wheels' track, i.e., the lateral distance between wheels at the point of contact with the road surface and the center line of the chassis. The assembly shown in FIG. 11 can be added to the wheel assemblies shown in FIGS. 2, 4 and 9 to provide further precision control of the vehicles' attitude in response to driving conditions.

To change the track of the wheels, a hydraulic cylinder 322 is provided pivotally fixed to the vehicle chassis at its end 324. Hydraulic lines 326 and 328 direct fluid under pressure to opposite sides of the cylinder's piston member and a plunger rod 330 extends from the cylinder 322 to extend and retract responsive to the introduction of fluid through lines 326 and 328.

The free end 322 of plunger rod 330 is pivotally connected to one end 334 of a linkage arm 336 which is in turn pivotally secured at its midpoint 338 to the vehicle chassis. The other end 340 of linkage arm 336 is pivotally connected to lower control arm 54 at end 56 which, in this instance, is not fixed to the chassis. Thus, it is seen, as plunger rod 330 extends and retracts responsive to actuation of cylinder 322, the distance or track between wheels is altered.

In addition, a variable resistor 342 and control arm 344 in wiping engagement linked to plunger rod 330 by connecting arm 346 is provided. As in the embodiments described previously, the relative position of control arm 344 with respect to variable resistor 342 provides a voltage reading proportional to the position of the wheels and this information is also sent to the central control processor.

Figure 12:
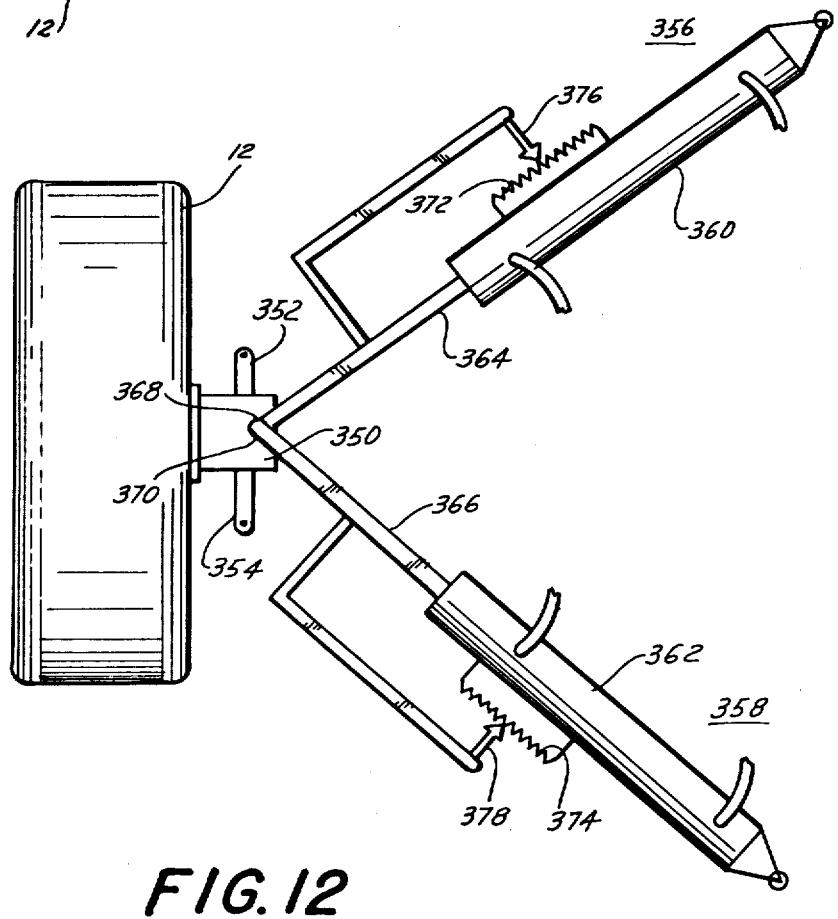
FIG. 12 is a diagrammatic representation of a mechanism to change any one of wheel camber, caster, wheel track or toe-in/toe-out.

Reference is now made to FIG. 12 where a mechanism to control both wheel camber and caster concurrently is shown. Such a mechanism provides more precise control of the vehicle attitude. Where such precise control is desired the mechanism shown in FIG. 12 can be used in place of the mechanism shown in FIGS. 4 and 5 which adjusts only wheel camber.

As illustrated, a typical wheel 12 of a vehicle includes a hub extension 350 having extending lugs 352 and 354, respectively. The camber and caster control mechanism includes a pair of upper control arm assemblies 356 and 358, respectively. Each upper control arm assembly includes hydraulic cylinders 360 and 362, respectively, having one end pivotally secured to the vehicle chassis. Each cylinder includes fluid access lines to each side of a piston and an extending plunger rod 364 and 366, respectively, pivotally secured at their respective free ends 368 and 370 to the upper portion of wheel hub 350.

In addition, variable resistors 372 and 374, respectively, are provided for each cylinder with control arms 376 and 378, respectively, linked to each plunger rod 364 and 366, to provide a voltage drop correlation proportional to the degree of extension and retraction of each respective plunger rod.

The control arm assemblies 356 and 358 are disposed as the upper control arm assemblies to each wheel. Each wheel also includes lower control arm assemblies (not shown) disposed parallel to and below control arm assemblies 356 and 358. These lower control arm assemblies may be extendable and retractable assemblies such as assemblies 356 and 358 or, alternatively, may be rigid arm members connected from the vehicle chassis to the lower portion of wheel hub 350.

With the arrangement shown and using extensible lower control arms similar to extensible control arms 356 and 358, control of wheel caster and camber can be maintained as well as control of wheel toe-in and toe-out and wheel track. However, with the lower control arms being rigid, the mechanism of FIG. 12 will control caster and camber only as the rigid lower control arms will not permit change in wheel toe-in or toe-out.

Alternatively, upper control arm assemblies 356 and 358 may be respectively secured to the ends of lugs 352 and 354 with either rigid or extensible lower control arms also respectively secured to the lower portion of lugs 352 and 354. With this arrangement, a greater degree of universal pivoting action would be imparted to each wheel. With extensible upper and lower control arms connected to the lugs 352 and 354, precise control through selective actuation of the four control arm cylinders could control wheel caster and camber as well as toe-in, toe-out and wheel track. For example, correlation of both upper control arm cylinders with both lower control arm cylinders will control camber and wheel track, correlation of the rearmost upper and lower control arm cylinders with the upper and lower forward control arm cylinders will control toe-in and toe-out, and correlation of the upper forward and rear lower control arm cylinders with rear upper and forward lower control arm cylinders will control wheel caster. Thus the mechanism of FIG. 12 may accomplish all of the control functions if so desired.

Figure 13:
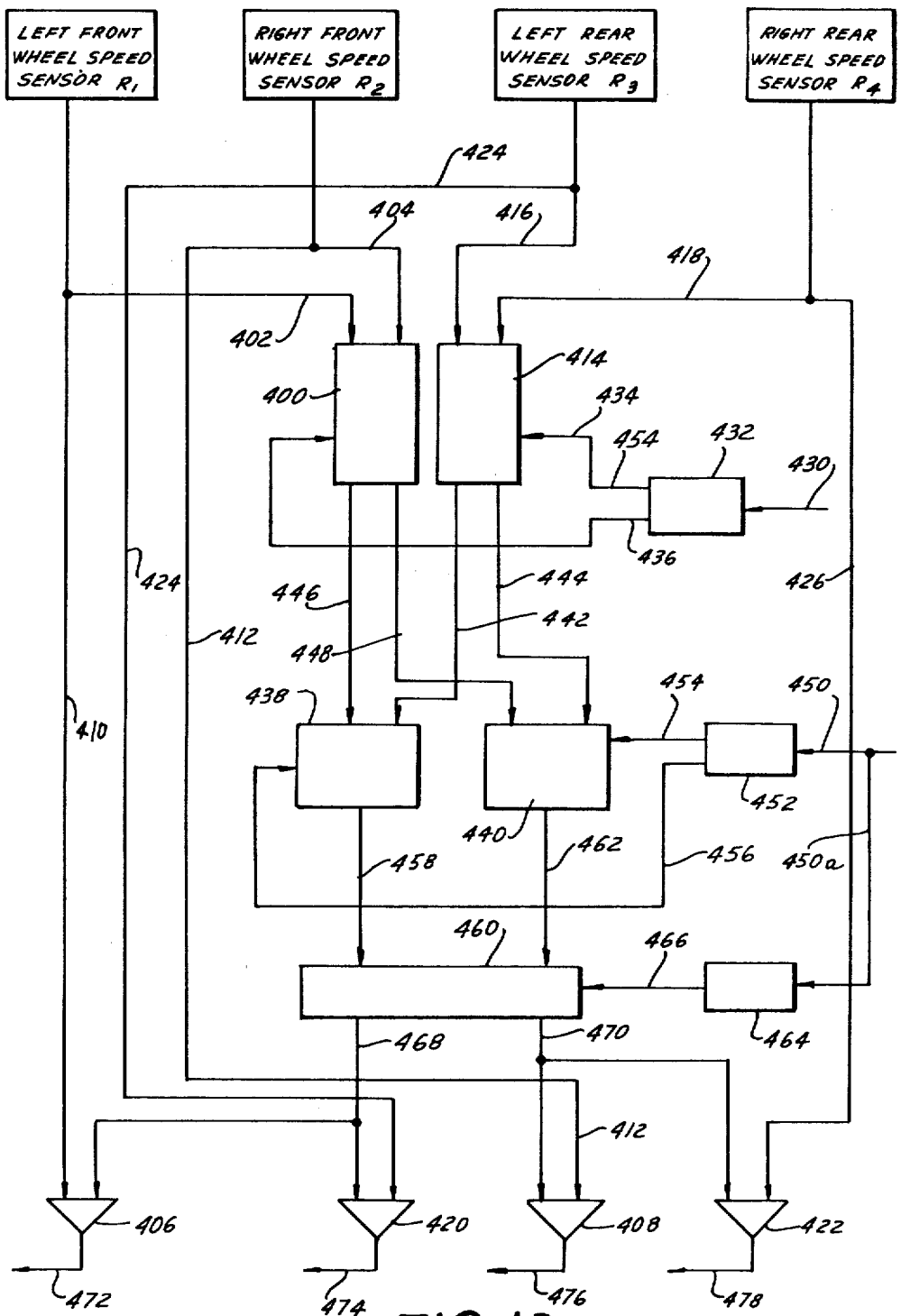
FIG. 13 is a logic circuit diagram showing the integration of wheel speed at each wheel which is fed to the central information processor of the vehicle suspension system.
Figure 14:
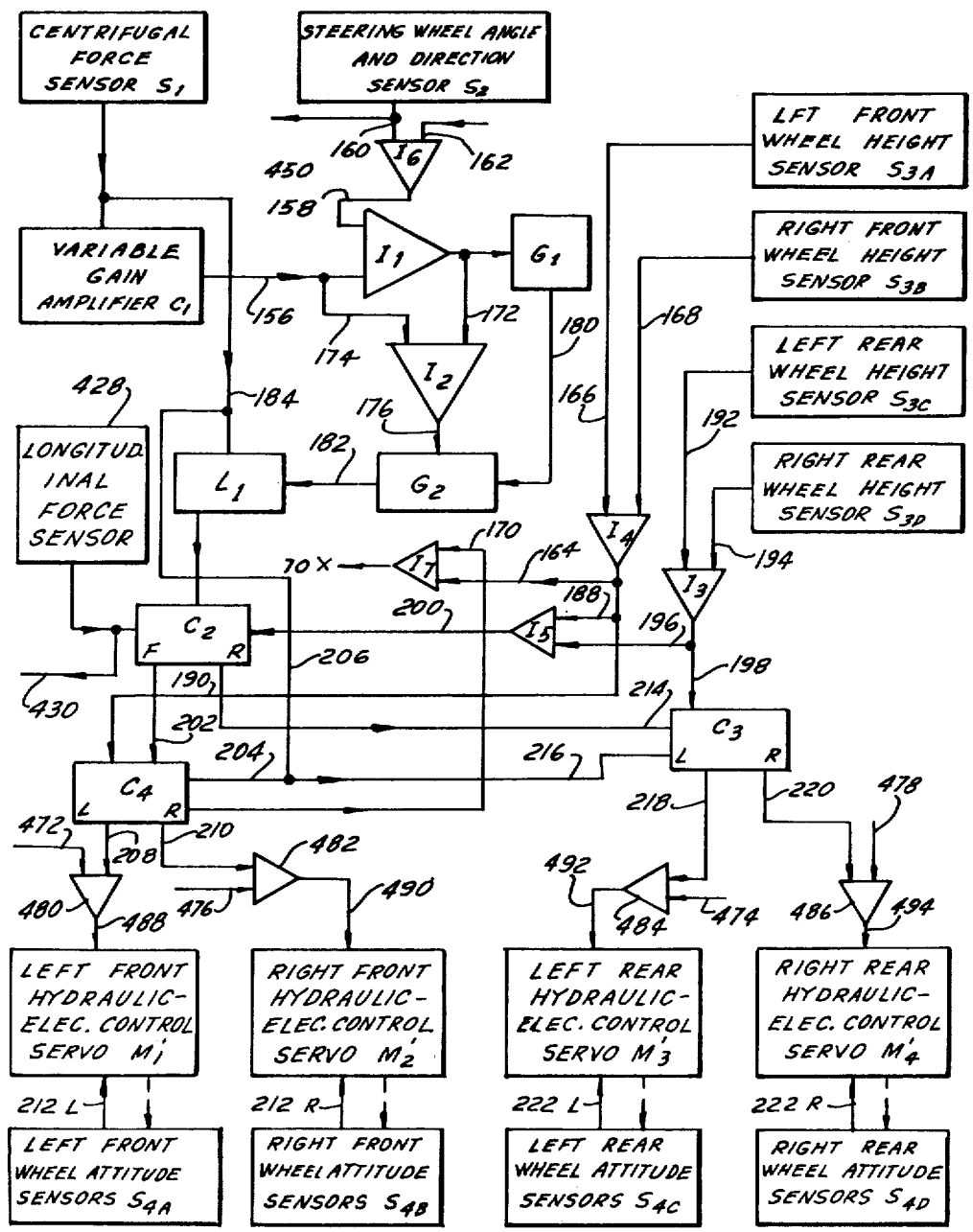
FIG. 14 is a block diagram similar to FIG. 6 showing the incorporation of wheel speed and longitudinal force information.

Reference is now made to FIGS. 13 and 14 where diagrammatic representations of logic control circuit for the central control processor are shown which is used to initiate a change in wheel attitude in response to variations in the rotational speed of each wheel of the vehicle, sensed changes in longitudinal and lateral forces acting on the vehicle and sensed changes in steering wheel angle.

As shown in FIG. 13, the rotational speed indicator for the left and right front and left and right rear wheels are indicated at $R_1$ through $R_4$, respectively. Each of these represents the signals generated by the respective wheel tachometers 258. The signal output from wheel speed sensors $R_1$ and $R_2$ is fed to an analog gate 400 via lines 402 and 404, respectively, and to comparator-integrators 406 and 408, respectively, via branch lines 410 and 412, respectively. In like manner, the signal output from wheel speed sensors $R_3$ and $R_4$ are fed to an analog gate 414 via lines 416 and 418, respectively, and to comparator-integrators 420 and 422, respectively, via branch lines 424 and 426, respectively. Thus the signals from the front wheel speed sensors $R_1$ and $R_2$ are fed to analog gate 400 and comparator-integrators 406 and 408, respectively, while the signals from the rear wheel speed sensors $R_3$ and $R_4$ are fed to analog gate 414 and comparator-integrators 420 and 422, respectively.

In addition the signal received from the longitudinal force sensor, i.e., voltage change from variable resistor 112A (FIG. 7) which is fed to longitudinal force sensor 248 (FIG. 14), is fed via line 430 to a gating circuit 432 having dual outputs 434 and 436. The output of gating circuit 432 via line 434 is fed to analog gate 414 and the output via line 436 is fed to analog gate 400. Longitudinal force sensor 428 is operable so that if a deceleration force, i.e., braking is sensed, or if an acceleration force is sensed, the signal sent to gating circuit 432 activates one of the outputs 434 or 436. Thus if a deceleration force is sensed gating circuit 430 activates output 436 and deactivates output 434, while a sensed acceleration force activates output 436.

Alternatively, if no separate longitudinal force sensor (FIG. 7) is used, the equivalent information to reflect longitudinal forces acting on the vehicle can be obtained, although without the same degree of accuracy, from the output at 200 of integrator $I_5$ (FIGS. 6 and 14) which can be fed to the input at 430 of gating circuit 432.

Referring again to FIG. 13, if an acceleration force is sensed, the output 434 of gating circuit 432 is activated and since this output is fed to analog gate 414 this gate is activated to feed analog information present in gate 414 to a pair of analog gates 438 and 440 via lines 442 and 444, respectively, from the output of analog gate 414. If a deceleration force is sensed, the output 436 of gating circuit 432 is activated and this output is fed to analog gate 400 to activate this gate which in turn is activated to feed analog information present in this gate to analog gates 438 and 444 via lines 446 and 448, respectively, from the output of analog gate 400. The net effect at this point is for the central control processor to choose analog information from the front wheel sensors $R_1$ and $R_2$ on sensed acceleration of the vehicle and the rear wheel sensors $R_3$ and $R_4$ on sensed deceleration of the vehicle.

In addition to the above information, the output from steering wheel angle and director sensor $S_2$ is fed via line 450 (FIG. 14) to a gating circuit 452 (FIG. 13) which has one output 454 fed to analog gate 440 and a second output 456 fed to analog gate 438. The output 454 of gating circuit 452 is activated, and output 456 deactivated, when steering wheel sensor $S_2$ indicates the vehicle is turning left and, in like manner, output 456 is activated and output 454 deactivated when the vehicle is turning right. Alternatively, if no steering wheel angle sensor is provided, the output of centrifugal force sensor $S_1$ (FIG. 14) can be utilized to provide the desired information of the direction of vehicle turn or an integration of the outputs from $S_1$ and $S_2$ could be used. Thus gating circuit 452 determines whether the vehicle is turning right or left and this information activates either analog gate 438 or 440.

If sensor $S_2$ determines a right turn is being made, output 456 of gating circuit 452 is activated to activate analog gate 438 which transmits analog information present from its activated input from lines 442 or 446. This information is transmitted from the output of analog gate 438 via line 458 to an integrator 460. In like manner, if sensor $S_2$ determines a left turn is being made, output 454 of gating circuit 452 is activated to activate analog gate 440 which transmits analog information present from its activated input lines 444 or 448 and this information is transmitted from the output of analog gate 440 via line 462 to integrator 460. The net effect at this point is choosing information from one of the four wheel speed sensors $R_1$ through $R_4$. The sensor chosen to supply information would be the outside rear wheel sensor, either $R_3$ or $R_4$ depending upon the direction of turn, when the vehicle is decelerating in a turn or the outside front wheel sensor, either $R_1$ or $R_2$ depending upon the direction of turn when the vehicle is accelerating in a turn. The wheel speed sensor chosen to supply information to integrator 460 will be that wheel least affected by the combination of load transfer with accelerating or deceleration.

The output from the steering wheel angle and direction sensor $S_2$ via branch line $450_a$ is also transmitted to another integrator 464. This integrator determines an error signal curve, that is a curve value of the difference between inside and outside wheel speeds when the vehicle traverses a turn of specific radius, or alternatively when the centrifugal force acting on the vehicle is of a predetermined magnitude. This error signal curve is transmitted to integrator 460, via lines 466, where integrator 460 integrates the error curve value with the information from the wheel chosen to supply information to integrator 460 as explained above. The output signal from integrator 460 via the dual outputs through lines 468 and 470 is fed via line 468 to comparator-integrators 406 and 420, respectively, and the output of integrator 460 via line 470 is fed to comparator-integrators 408 and 422, respectively.

As explained above, comparator-integrators 406 and 420 concurrently receive inputs from wheel speed sensors $R_1$ and $R_3$, respectively, and comparator-integrators 408 and 422 concurrently receive inputs from wheel speed sensors $R_2$ and $R_4$, respectively. The net effect of the inputs to comparator-integrators 406, 408, 420 and 422 is to determine the slippage of each wheel and to determine a control value to modify or change the attitude of the wheels with respect to the vehicle body. These control values are transmitted via lines 472, 474, 476 and 478, respectively, to the respective servo control mechanisms at each wheel.

With reference to FIG. 14, it is seen that the signal outputs from comparator-integrators 406, 420, 408 and 422 are transmitted via lines 472, 474, 476 and 478, respectively, to integrators 480, 482, 484 and 486. Thus line 472 from comparator-integrator 406 transmits the signal to integrator 480, line 474 from comparator-integrator 420 to integrator 484, line 476 from comparator-integrator 408 to integrator 482 and line 478 from comparator-integrator 422 to integrator 486.

Integrator 480 also receives, in line 208, the information from the left side output of gated memory integrator $C_4$ and integrator 482 receives, via line 210, the right side output of gated memory integrator $C_4$. Gated memory integrator $C_4$ (FIG. 14) receives the same information signals described with reference to FIG. 6 with the addition of the information transmitted from longitudinal force sensor 428 which is fed to double integrator $C_2$.

In like manner, integrator 484 also receives, via line 218, the left side output of gated memory integrator $C_3$ while integrator 486 receives, via line 220, the right side output of gated memory integrator $C_3$.

The output from each integrator 480, 482, 484 and 486 is respectively transmitted via lines 488, 490, 492 and 494 to the respective hydraulic-electric wheel attitude control assemblies $M'_1$, $M'_2$, $M'_3$ and $M'_4$, respectively, where, in response to the respective signals received, the control assemblies at each wheel adjust the appropriate wheel attitude such as camber, caster, wheel height, toe-in or toe-out and wheel track.

As in the embodiment of FIG. 6, the wheel attitude sensors $S'_{4A}$, $S'_{4B}$, $S'_{4C}$ and $S'_{4D}$, respectively, feed back a correlating signal of the sensed wheel attitude to its respective control servo to control the change in wheel attitude in the same manner as explained with reference to FIG. 6.

It is thus seen that the present invention adds to the invention disclosed in the aforesaid co-pending application an automobile suspension system which exhibits a greater degree of sophistication and precise control in providing more accurate and precise information as to forces acting on the vehicle and the vehicle's behavior. This additional information is used to effect changes in wheel height, camber, caster, toe-in, toe-out and wheel track to provide more sophisticated control over the vehicle through the suspension system.

The invention contemplates using all of the disclosed attitude and force sensors and responsive controls in combination or selected ones of the various disclosed attitude sensors and responsive controls in various combinations. The greatest degree of precision control and sophistication results from utilization of all disclosed attitude sensors and responsive controls but significantly enhanced performance over existing prior art suspension systems may still be attained using selected ones of the various attitude sensors and responsive control means in various combinations.

The additional sophistication of the present invention allows the suspension system to filter out bumps occurring at the front or rear wheels and to more precisely account for wheel slippage as may occur when driving on icy road conditions, on sandy road surfaces or during rapid braking or acceleration.

The net objective of using any combination of sensors and responsive controls is to optimize each wheel's attitude with respect to the road surface, to change such parameters to such degree and at such rate as to optimize traction controllability, maneuverability as well as occupant comfort.

We claim:

1. An adjusting vehicle suspension system for a vehicle having a chassis and an individual suspension system at each wheel of the vehicle comprising:
   sensing means at each wheel of the vehicle to sense the height of the vehicle chassis with respect to each said wheel;
   sensing means on said vehicle to sense centrifugal force acting on said vehicle;
   sensing means on said vehicle to sense longitudinal forces acting on said vehicle due to acceleration or deceleration;
   control means carried by said vehicle to receive sensed changes in vehicle performance as indicated by the said sensing means;
   said control means including means to alter and adjust camber, castor, toe-in/out, or wheel track of each said wheel with respect to said vehicle chassis to maintain optimum road contact between each said wheel and the road based on a correlation of the factors sensed by said sensing means.

2. An adjusting vehicle suspension system for a vehicle as defined in claim 1 including sensing means associated with each said wheel to sense rotational speed of each said wheel.

3. An adjusting vehicle suspension system for a vehicle as defined in claim 1 including sensing means on said vehicle to sense changes in steering wheel direction of said vehicle.

4. An adjusting vehicle suspension system for a vehicle as defined in claim 1 including sensing means associated with each said wheel to sense rotational speed of each said wheel and sensing means on said vehicle to sense changes in steering wheel direction of said vehicle.

5. An adjusting vehicle suspension system for a vehicle having a chassis and an individual suspension system at each wheel of the vehicle comprising:
   sensing means at each wheel of the vehicle to sense the height of the vehicle chassis with respect to each said wheel;
   sensing means on said vehicle to sense centrifugal force acting on said vehicle;
   sensing means associated with each said wheel to sense rotational speed of each said wheel;
   control means carried by said vehicle to receive sensed changes in vehicle performance as indicated by the said sensing means;
   said control means including means to alter and adjust camber, castor, toe-in/out, or wheel track of each said wheel with respect to said vehicle chassis to maintain optimum road contact between each said wheel and the road based on a correlation of the factors sensed by said sensing means.

6. An adjusting vehicle suspension system for a vehicle as defined in claim 5 including sensing means on said vehicle to sense changes in steering wheel direction of said vehicle.

7. An adjusting vehicle suspension system for a vehicle having a chassis and an individual suspension system at each wheel of the vehicle comprising:
   sensing means at each wheel of the vehicle to sense the height of the vehicle chassis with respect to each said wheel;
   sensing means on said vehicle to sense changes in steering wheel direction of said vehicle;
   sensing means on said vehicle to sense longitudinal forces acting on said vehicle due to acceleration or deceleration;
   control means carried by said vehicle to receive sensed changes in vehicle performance as indicated by the said sensing means;
   said control means including means to alter and adjust camber, castor, toe-in/out, or wheel track of each said wheel with respect to said vehicle chassis to maintain optimum road contact between each said wheel and the road based on a correlation of the factors sensed by said sensing means.

8. An adjusting vehicle suspension system for a vehicle as defined in claim 7 including sensing means associated with each said wheel to sense rotational speed of each said wheel.

9. An adjusting vehicle suspension system for a vehicle having a chassis and an individual suspension system at each wheel of the vehicle comprising:
   sensing means at each wheel of the vehicle to sense the height of the vehicle chassis with respect to each said wheel;
   sensing means associated with each said wheel to sense rotational speed of each said wheel;
   sensing means on said vehicle to sense changes in steering wheel direction of said vehicle;
   control means carried by said vehicle to receive sensed changes in vehicle performance as indicated by the said sensing means;
   said control means including means to alter and adjust camber, castor, toe-in/out, or wheel track of each said wheel with respect to said vehicle chassis to maintain optimum road contact between each said wheel and the road based on a correlation of the factors sensed by said sensing means.

10. An adjusting vehicle suspension system for a vehicle having a chassis and an individual suspension system at each wheel of the vehicle comprising:

sensing means at each wheel of the vehicle to sense the height of the vehicle chassis with respect to each said wheel;

sensing means associated with each said wheel to sense rotational speed of each said wheel;

sensing means on said vehicle to sense longitudinal forces acting on said vehicle due to acceleration or deceleration;

control means carried by said vehicle to receive sensed changes in vehicle performance as indicated by the said sensing means;

said control means including means to alter and adjust camber, castor, toe-in/out, or wheel track of each said wheel with respect to said vehicle chassis to maintain optimum road contact between each said wheel and the road based on a correlation of the factors sensed by said sensing means.

11. An adjusting vehicle suspension system for a vehicle as defined in claim 1, 2, 3, 4, 5, 6, 7, 8, 9 or 10 wherein said means to adjust at least one selected attitude of each said wheel includes activated means operative to alter and adjust each said wheel's attitude responsive to a signal received from said control means.

12. An adjusting vehicle suspension system for a vehicle as defined in claim 11 including servo control means operative to control said activated means responsive to said signal received from said control means.

13. An adjusting vehicle suspension system for a vehicle as defined in claim 12 including means at each said wheel to sense the actual degree of said wheel's attitude.

14. An adjusting vehicle suspension system for a vehicle as defined in claim 13 including means to send the sensed changes in wheel attitude from said wheel attitude sensing means to said servo control means whereby said servo control means is operative to adjust the wheel attitude until the signal received from said control means equals the signal received from said wheel attitude sensing means.

15. An adjusting vehicle suspension system for a vehicle as defined in claim 1, 2, 3, 4, 5, 6, 7, 8, 9 or 10 including means within said control means to discern between vehicle conditions of short duration such as bumps and rapid steering wheel direction changes to preclude wheel attitude adjustments responsive to such short duration conditions.

16. An adjusting vehicle suspension system for a vehicle as defind in claim 1, 2, 3, 4, 5, 6, 7, 8, 9 or 10 wherein said control means includes means for adjusting and altering a wheel's attitude responsive to sensed static load distribution in said vehicle.

17. An adjusting vehicle suspension system for a vehicle as defined in claim 1, 2, 3, 4, 5, 6, 7, 8, 9 or 10 wherein said control means for adjusting and altering a wheel's attitude includes means to adjust said wheel's attitude to a predetermined neutral position when said vehicle is in a skid attitude.

18. An adjusting vehicle suspension system for a vehicle as defined in claim 1, 2, 3, 4, 5, 6, 7, 8, 9 or 10 including means to detect a malfunction in the system to lock out said means to alter and adjust a wheel's attitude and maintain each wheel in a predetermined neutral attitude when a malfunction in said control means is sensed.

* * * * *